(12) United States Patent
Hayward

(10) Patent No.: US 12,214,746 B2
(45) Date of Patent: Feb. 4, 2025

(54) CAR SEAT SEATBELT TIMER APPARATUS

(71) Applicant: Sherri Hayward, Aurora, CO (US)

(72) Inventor: Sherri Hayward, Aurora, CO (US)

(*) Notice: Subject to any disclaimer, the term of this patent is extended or adjusted under 35 U.S.C. 154(b) by 33 days.

(21) Appl. No.: 18/122,494

(22) Filed: Mar. 16, 2023

(65) Prior Publication Data
US 2024/0308464 A1 Sep. 19, 2024

(51) Int. Cl.
B60R 22/48 (2006.01)

(52) U.S. Cl.
CPC ...... B60R 22/48 (2013.01); B60R 2022/4808 (2013.01)

(58) Field of Classification Search
None
See application file for complete search history.

(56) References Cited

U.S. PATENT DOCUMENTS

| | | |
|---|---|---|
| D450,935 S | 11/2001 | Dranschak |
| 8,217,796 B2 | 7/2012 | Trummer |
| 9,545,856 B2 | 1/2017 | Borgne |
| 9,849,728 B2 | 12/2017 | Alfaro Fonseca |
| 9,896,060 B2 * | 2/2018 | Koike ............... B60R 22/48 |
| 11,631,315 B1 * | 4/2023 | Menchaca ......... G08B 21/24 340/457 |
| 2008/0088426 A1 | 4/2008 | Lima |
| 2009/0079557 A1 | 3/2009 | Miner |
| 2013/0033373 A1 | 2/2013 | Thomas |

FOREIGN PATENT DOCUMENTS

WO   WO2016127118   8/2016

* cited by examiner

Primary Examiner — Thomas S McCormack

(57) ABSTRACT

A car seat seatbelt timer apparatus for alerting a user to a child's presence in a car seat includes a car seat with a buckle that releasably joins a pair of seatbelt segments together. When the buckle is closed, a switch is moved into an activated position, which initiates a timer. Once the timer reaches a predetermined time interval, an audible alarm is generated to notify a user that the buckle has been closed for the length of time of the predetermined time interval. A notification is also sent to a remote electronic device after the predetermined time interval elapses.

7 Claims, 5 Drawing Sheets

CAR SEAT SEATBELT TIMER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to child safety apparatuses and more particularly pertains to a new child safety apparatus for alerting a user to a child's presence in a car seat.

(2) Description of Related Art Including Information Disclosed Under 37 CFR 1.97 and 1.98

The prior art includes several examples of child safety apparatuses which notify a user that a child occupies a car seat. Some of these devices include a control circuit positioned in a buckle which initiates a process of detecting whether a child placed in the car seat is in a hazardous situation, such as being left unattended or experiencing dangerously high temperatures. Some of these apparatuses use additional sensors such as a temperature sensor to determine the temperature of the car seat's environment and a pressure sensor to determine the presence of the child in the car seat. Some apparatuses communicate with the vehicle the car seat is placed in to determine whether the vehicle motor or electrical system is activated, and some apparatuses communicate with a remote device to determine whether a user holding the key fob has left the child unattended.

All of these apparatuses of the prior art include one of these components for identifying an emergent condition. However, the prior art fails to disclose a device which uses a timer to measure the length of time the buckle is closed and produces an audible alarm after a predetermined time interval has elapsed. Such a device is desirable as an alternative to the prior art for being alerted to the presence of a child in a car seat.

BRIEF SUMMARY OF THE INVENTION

An embodiment of the disclosure meets the needs presented above by generally comprising a car seat with a seatbelt and a buckle. The seatbelt has a pair of segments which is coupled to the buckle, and the buckle releasably couples the pair of segments of the seatbelt together. The buckle includes a male portion and a female portion. A switch is mounted to the buckle. The switch is positioned in an activated position when the male portion of the buckle is coupled to the female portion and is positioned in a deactivated position when the male portion is decoupled from the female portion. A control circuit is electrically coupled to the switch and is programmed to initiate a timer when the switch is moved into the activated position. The control circuit is also programmed to terminate the timer when the switch is positioned in the deactivated position. A sound emitter is electrically coupled to the control circuit and generates an audible alarm when the timer runs for a predetermined time interval.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
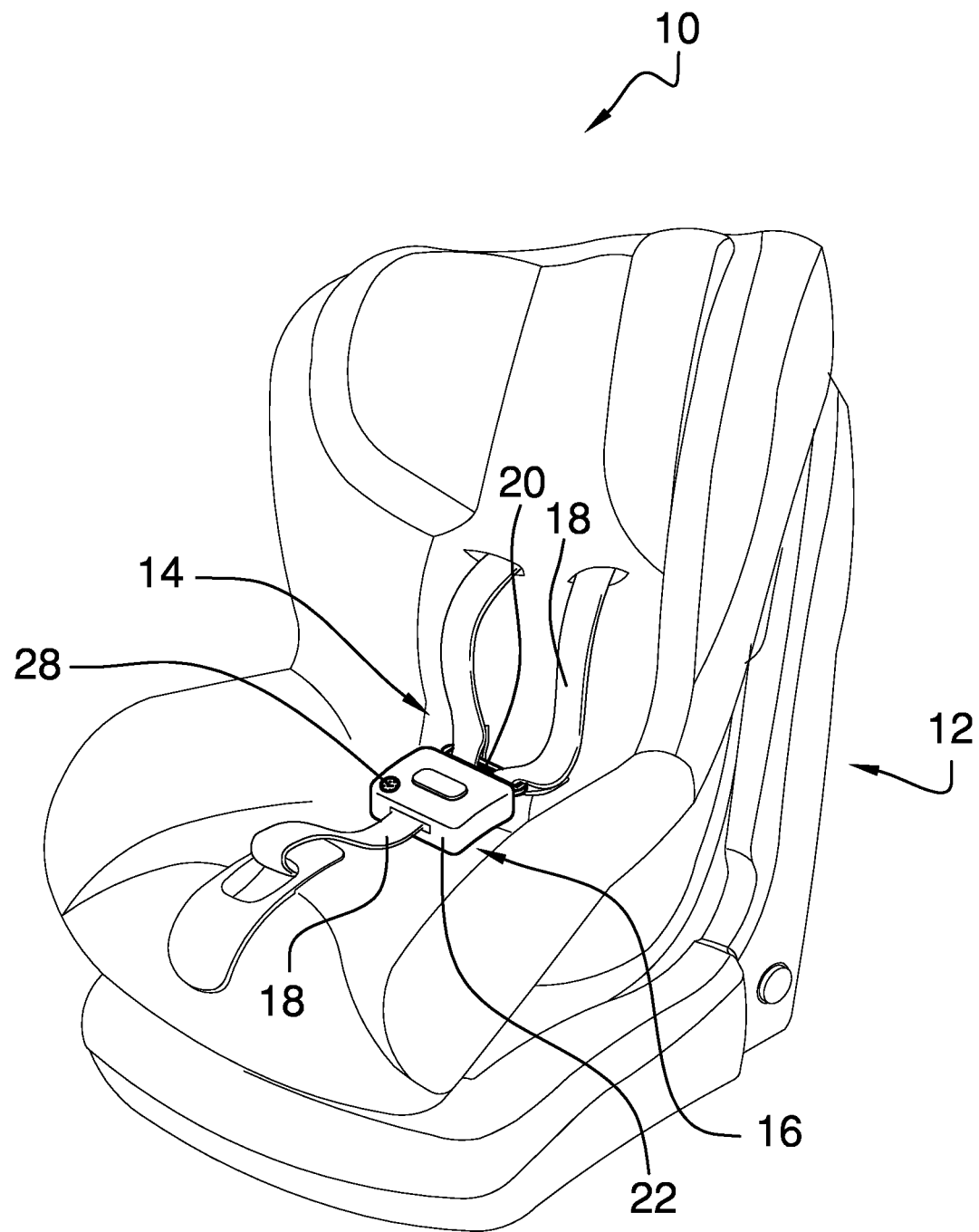
FIG. 1 is a perspective view of a car seat seatbelt timer apparatus according to an embodiment of the disclosure.
Figure 2:
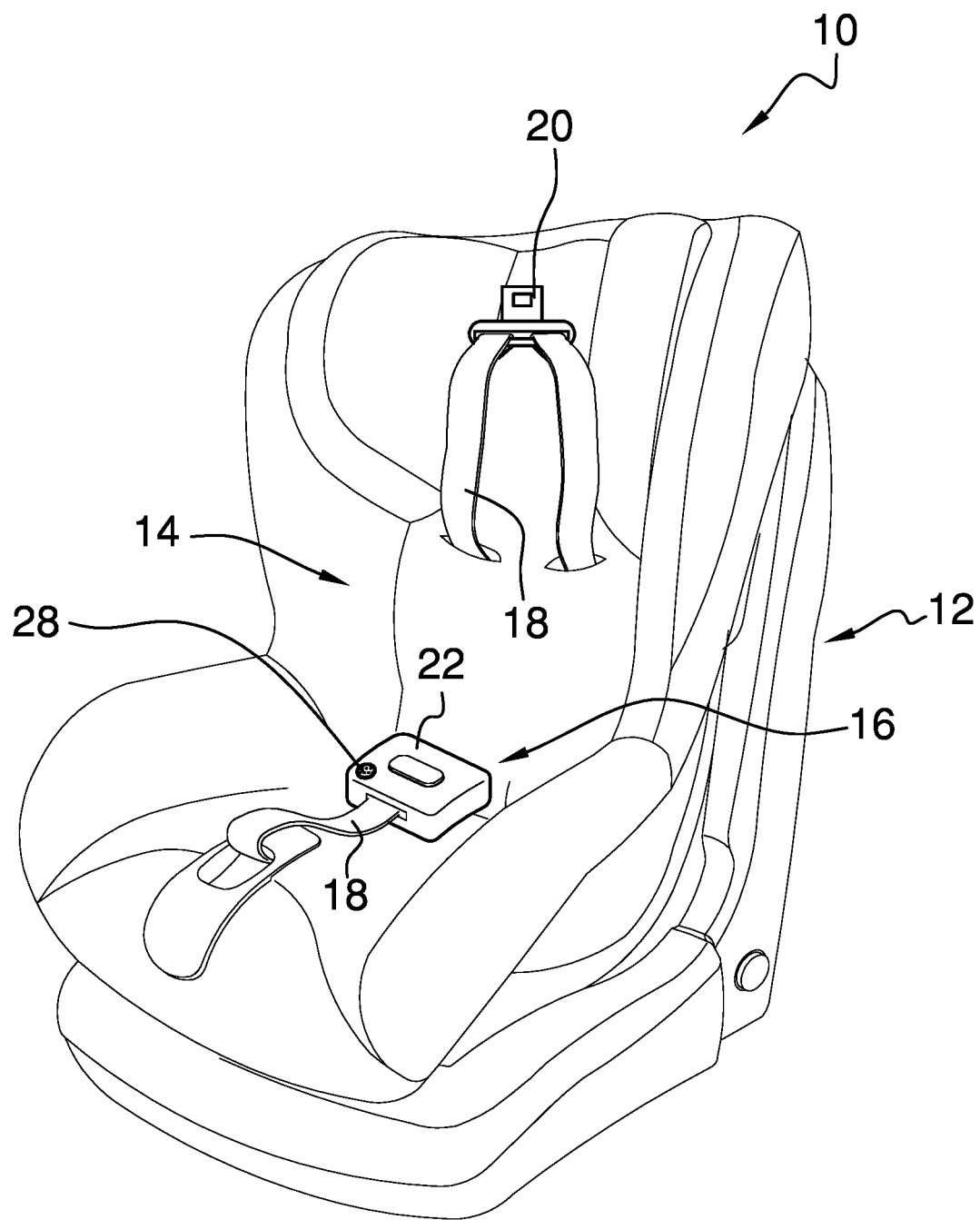
FIG. 2 is a perspective view of an embodiment of the disclosure.
Figure 3:
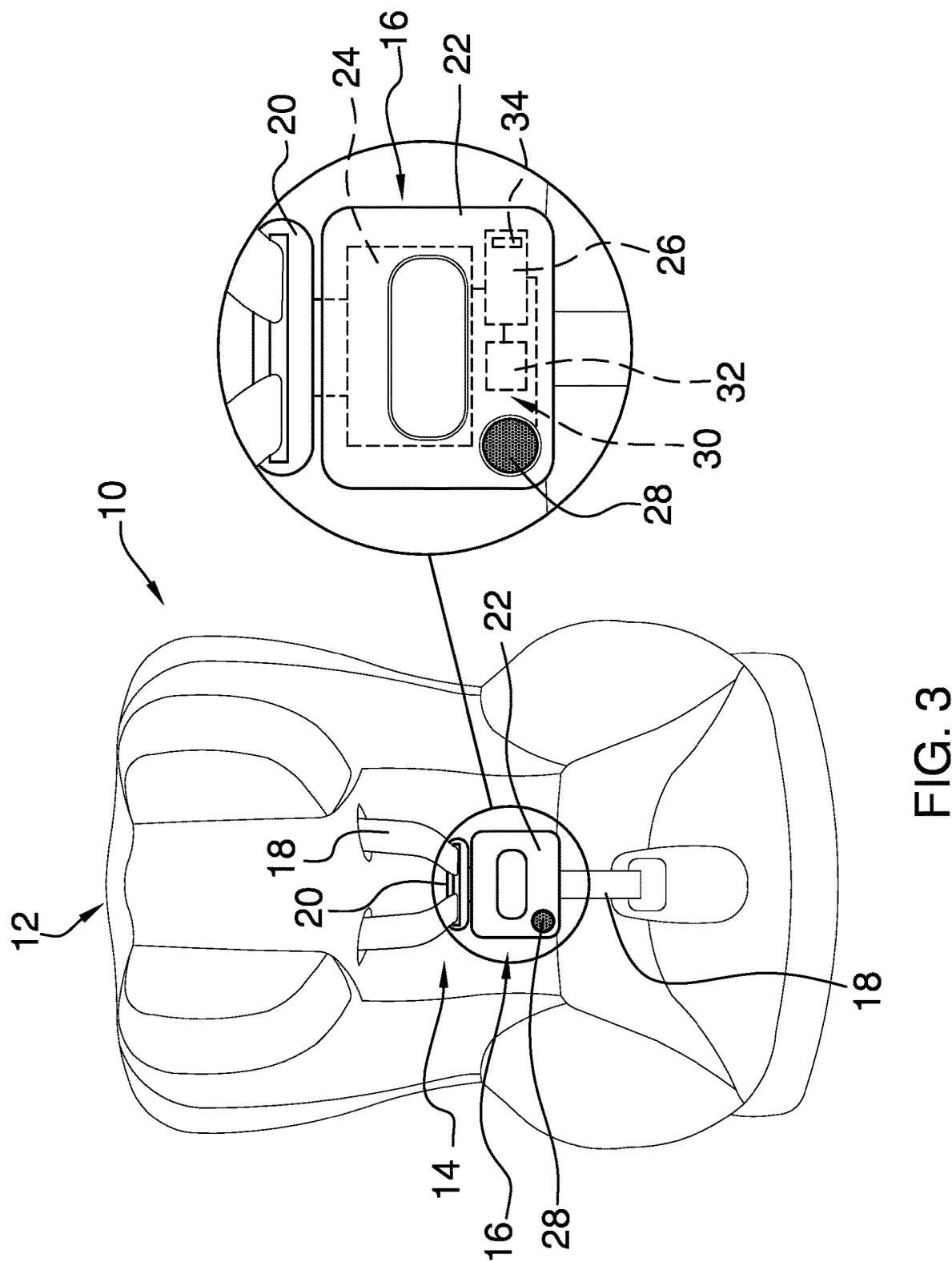
FIG. 3 is a front view of an embodiment of the disclosure.
Figure 4:
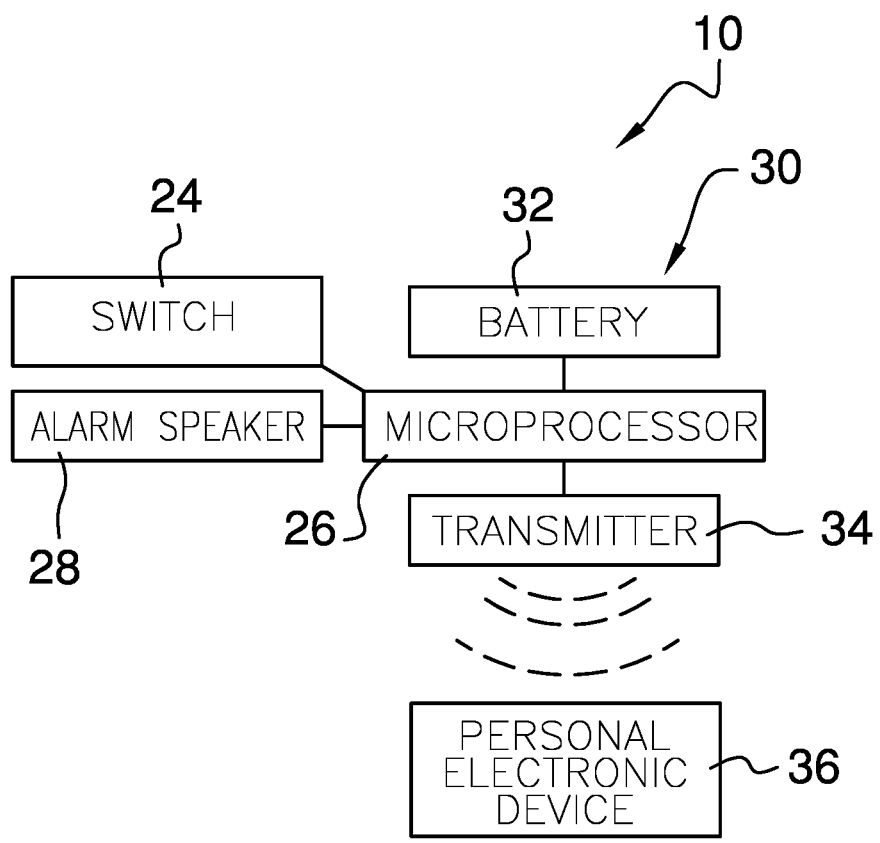
FIG. 4 is a block diagram of an embodiment of the disclosure.
Figure 5:
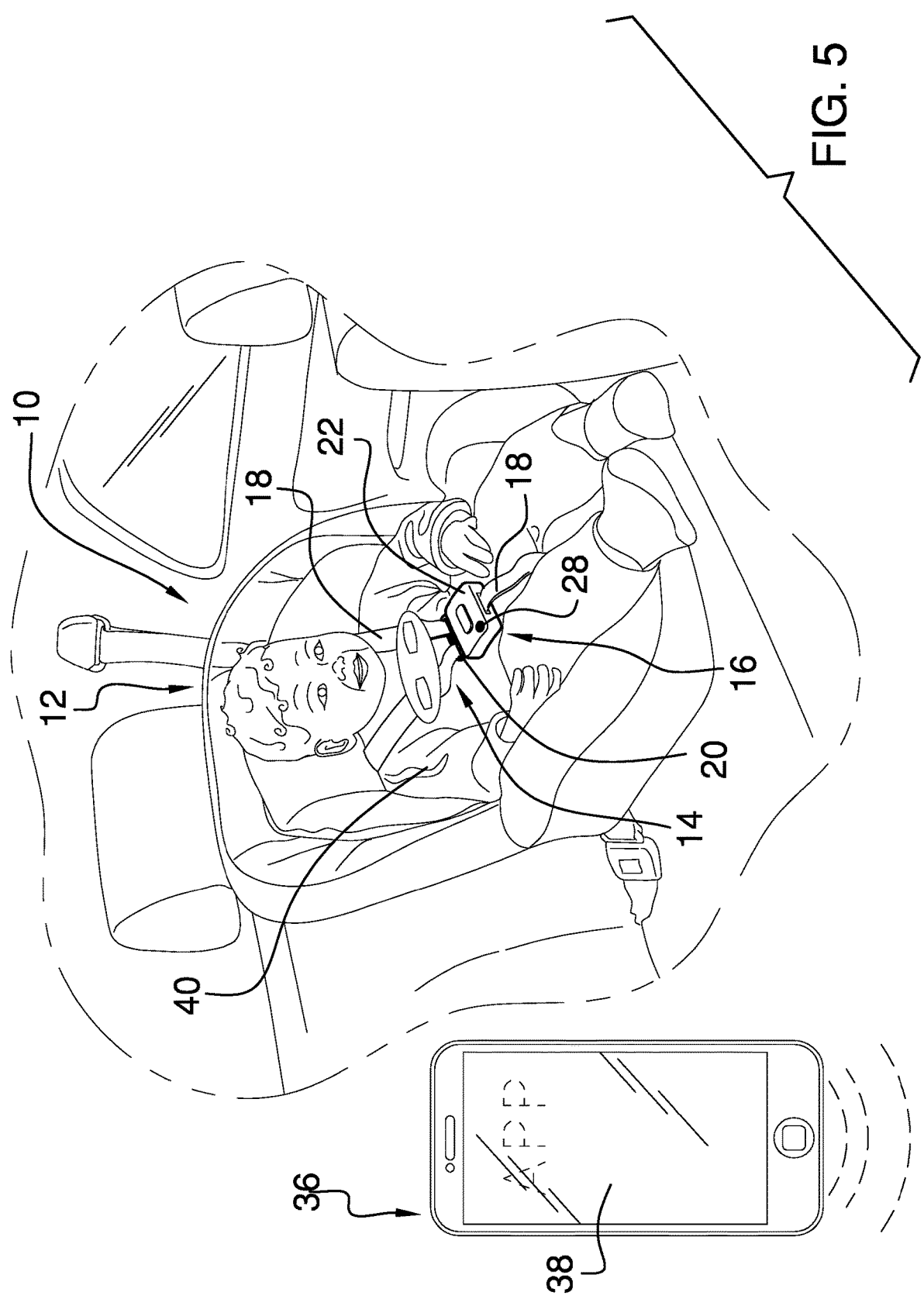
FIG. 5 is an in-use view of an embodiment of the disclosure.

With reference now to the drawings, and in particular to FIGS. 1 through 5 thereof, a new child safety apparatus embodying the principles and concepts of an embodiment of the disclosure and generally designated by the reference numeral 10 will be described.

As best illustrated in FIGS. 1 through 5, the car seat seatbelt timer apparatus 10 generally comprises a car seat 12 with a seatbelt 14 and a buckle 16. The buckle 16 is coupled to each of a pair of segments 18 of the seatbelt 14 and is arranged to releasably couple the pair of segments 18 together. The buckle 16 includes a male portion 20 and a female portion 22 which receives the male portion 20. A switch 24 is mounted to and positioned in the female portion 22 of the buckle 16 such that the switch 24 is positioned in an activated position when the male portion 20 of the buckle 16 is coupled to the female portion 22 and is positioned in a deactivated position when the male portion 20 is decoupled from the female portion 22. A control circuit 26 is electrically coupled to the switch 24 and positioned in the female portion 22 of the buckle 16. The control circuit 26 is programmed to initiate a timer when the switch 24 is moved into the activated position and is programmed to terminate the timer when the switch 24 is positioned in the deactivated position.

A sound emitter 28 is electrically coupled to the control circuit 26 and positioned in the female portion 22 of the buckle 16. When the timer runs for a predetermined time interval, the sound emitter 28 generates an audible alarm. The predetermined time interval may be selected by a user via an input or preset during manufacture. The predetermined time interval may be for any length of time including, for example, 1.0 minute, 5.0 minutes, 10.0 minutes, and others. After the predetermined time interval is reached, the control circuit 26 may reset and reinitiate the timer so that the audible alarm will be sounded periodically until the male portion 20 of the buckle 16 is removed from the female portion 22 to move the switch 24 to the deactivated position to terminate the timer. The audible alarm also may be sounded continuously until deactivated by decoupling of the buckle 16 or another input. A power supply 30 is electrically coupled to the control circuit 26 and is positioned in the female portion 22 of the buckle 16. The power supply 30 comprises a battery 32.

A transmitter 34 is electrically coupled to the control circuit 26 and positioned in the female portion 22 of the buckle 16. A remote electronic device 36 is programmed to receive communication from the transmitter 34. When the timer runs for the predetermined time interval, the transmitter 34 generates a wireless signal which is received by the remote electronic device 36. The remote electronic device 36 displays a notification on a display screen 38 of the remote electronic device 36 when the wireless signal is received. The timer may be reset such that the notification is displayed periodically each time the predetermined time interval is reached by the timer. The remote may be a smartphone, a tablet, a personal computer, or the like.

There also may be provided a receiver which is electrically coupled to the control circuit 26 and is in wireless communication with the remote electronic device 36. The remote electronic device 36 may include programming for receiving instructions from the user through an input and transmitting the instructions to the control circuit 26. The instructions may include, for example, a selection of the length of time for the predetermined time interval.

In use, a child 40 is placed in the car seat 12. The male portion 20 of the buckle 16 is coupled to the female portion 22 to couple the pair of segments 18 of the seatbelt 14 together and to move the switch 24 to the activated position to initiate the timer. If an input is provided, the user may select the length of time for the time interval. If the buckle 16 is uncoupled before the timer runs for the predetermined time interval, the sound emitter 28 does not sound the audible alarm and the remote electronic device 36 does not display the notification. If the buckle 16 remains coupled for the predetermined time interval, the audible alarm sounds and the notification is displayed, alerting the user that the child 40 has likely not been removed from the car seat 12. Depending on the embodiment, the timer may be reset and reinitiated, or the audible alarm may sound continuously until terminated by uncoupling the buckle 16 or another input.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A car seat seatbelt timer apparatus comprising:
   a child car seat having a seatbelt and a buckle, the child car seat being positionable in a seat of a vehicle, the seatbelt having a pair of segments being coupled to the buckle, the buckle releasably coupling the pair of segments of the seatbelt together, the buckle including a male portion and a female portion;
   a switch being mounted to the buckle, the switch being positioned in an activated position when the male portion of the buckle is coupled to the female portion, the switch being positioned in a deactivated position when the male portion is decoupled from the female portion;
   a control circuit being electrically coupled to the switch, the control circuit being programmed to initiate a timer when the switch is moved into the activated position wherein the timer is configured to correspond to how long a child has been secured into the child car seat, the control circuit being programmed to terminate the timer when the switch is positioned in the deactivated position;
   a sound emitter being electrically coupled to the control circuit, the sound emitter generating an audible alarm when the timer runs for a predetermined time interval; and
   if the buckle is uncoupled before the timer runs for the predetermined time interval, the sound emitter does not sound the audible alarm and the remote electronic device does not sound the audible alarm and an remote electronic devices does not display a notification.

2. The apparatus of claim 1, further comprising:
   a transmitter being electrically coupled to the control circuit, the transmitter generating a wireless signal when the timer runs for the predetermined time interval; and
   a remote electronic device being programmed to receive communication from the transmitter, the remote electronic device having a display screen, the remote electronic device displaying a notification on the display screen when the remote electronic device receives the wireless signal from the transmitter.

3. The apparatus of claim 1, further comprising a power supply being electrically coupled to the control circuit.

4. The apparatus of claim 3, wherein the power supply comprises a battery.

5. The apparatus of claim 1, wherein the switch is positioned in the female portion of the buckle, the control circuit being positioned in the female portion of the buckle, the sound emitter being mounted on the female portion of the buckle.

6. The apparatus of claim 2, wherein the transmitter is positioned in the female portion of the buckle, the power supply being positioned in the female portion of the buckle.

7. A car seat seatbelt timer apparatus comprising:
- a child car seat having a seatbelt and a buckle, the child car seat being positionable in a seat of a vehicle, the seatbelt having a pair of segments being coupled to the buckle, the buckle releasably coupling the pair of segments of the seatbelt together, the buckle including a male portion and a female portion;
- a switch being mounted to the buckle, the switch being positioned in an activated position when the male portion of the buckle is coupled to the female portion, the switch being positioned in a deactivated position when the male portion is decoupled from the female portion, the switch being positioned in the female portion of the buckle;
- a control circuit being electrically coupled to the switch, the control circuit being programmed to initiate a timer when the switch is moved into the activated position wherein the timer is configured to correspond to how long a child has been secured into the child car seat, the control circuit being programmed to terminate the timer when the switch is positioned in the deactivated position, the control circuit being positioned in the female portion of the buckle;
- a sound emitter being electrically coupled to the control circuit, the sound emitter generating an audible alarm when the timer runs for a predetermined time interval, the sound emitter being mounted on the female portion of the buckle;
- a transmitter being electrically coupled to the control circuit, the transmitter generating a wireless signal when the timer runs for the predetermined time interval, the transmitter being positioned in the female portion of the buckle;
- a remote electronic device being programmed to receive communication from the transmitter, the remote electronic device having a display screen, the remote electronic device displaying a notification on the display screen when the remote electronic device receives the wireless signal from the transmitter;
- a power supply being electrically coupled to the control circuit, the power supply comprising a battery, the power supply being positioned in the female portion of the buckle; and
- if the buckle is uncoupled before the timer runs for the predetermined time interval, the sound emitter does not sound the audible alarm and the remote electronic device does not sound the audible alarm and an remote electronic devices does not display a notification.

* * * * *